United States Patent
Liu et al.

(10) Patent No.: US 9,002,651 B2
(45) Date of Patent: Apr. 7, 2015

(54) RTM SEISMIC IMAGING WITHOUT SCRATCH DATA STORAGE SYSTEM AND METHOD

(75) Inventors: Lurng-Kuo Liu, White Plains, NY (US); Ligang Lu, New City, NY (US); Michael P. Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 13/364,025

(22) Filed: Feb. 1, 2012

(65) Prior Publication Data
US 2012/0316792 A1    Dec. 13, 2012

Related U.S. Application Data

(60) Provisional application No. 61/495,892, filed on Jun. 10, 2011.

(51) Int. Cl.
G01V 99/00 (2009.01)

(52) U.S. Cl.
CPC ............ G01V 99/00 (2013.01); *G01V 2210/67* (2013.01)

(58) Field of Classification Search
CPC ................................. G01V 1/28; G01V 99/00
USPC .......................................................... 702/16
See application file for complete search history.

(56) References Cited

U.S. PATENT DOCUMENTS

| | | | |
|---|---|---|---|
| 5,293,352 A | 3/1994 | Chambers | |
| 5,991,695 A | 11/1999 | Wang et al. | |
| 5,995,904 A * | 11/1999 | Willen et al. | 702/14 |
| 5,999,488 A | 12/1999 | Smith | |
| 6,021,094 A | 2/2000 | Ober et al. | |
| 6,327,537 B1 | 12/2001 | Ikelle | |
| 6,687,617 B2 | 2/2004 | Kelly | |
| 6,725,163 B1 | 4/2004 | Trappe et al. | |
| 6,996,470 B2 | 2/2006 | Kamps | |
| 7,072,767 B2 | 7/2006 | Routh et al. | |
| 7,196,969 B1 | 3/2007 | Karazincir | |
| 7,373,252 B2 | 5/2008 | Sherrill et al. | |
| 7,558,154 B2 | 7/2009 | Van Manen et al. | |
| 7,599,798 B2 | 10/2009 | Beasley et al. | |
| 7,675,815 B2 | 3/2010 | Saenger et al. | |

(Continued)

OTHER PUBLICATIONS

Sosa, "IBM System Blue Gene Solution: Blue Gene/P Application Developement", IBM Redbooks, http://www.redbooks.ibm.com/abstracts/sg247287.html, Aug. 2009.

(Continued)

*Primary Examiner* — Bryan Bui
(74) *Attorney, Agent, or Firm* — Scully, Scott, Murphy & Presser, P.C.; Daniel P. Morris, Esq.

(57) ABSTRACT

A system, method and computer program product for seismic imaging implements a seismic imaging algorithm utilizing Reverse Time Migration technique requiring large communication bandwidth and low latency to convert a parallel problem into one solved using massive domain partitioning. Several aspects of the imaging problem, including very regular and local communication patterns, balanced compute and communication requirements, scratch data handling and multiple-pass approaches. The partitioning of the velocity model into processing blocks allows each sub-problem to fit in a local cache, increasing locality and bandwidth and reducing latency.

26 Claims, 10 Drawing Sheets

(56) References Cited

U.S. PATENT DOCUMENTS

| | | | |
|---|---|---|---|
| 7,694,035 B2 | 4/2010 | Chen et al. | |
| 7,725,266 B2 | 5/2010 | Sirgue et al. | |
| 7,761,687 B2 | 7/2010 | Blumrich et al. | |
| 7,768,871 B2 | 8/2010 | Soubaras | |
| 7,788,334 B2 | 8/2010 | Blumrich et al. | |
| 7,802,025 B2 | 9/2010 | Chen et al. | |
| 7,886,084 B2 | 2/2011 | Chen et al. | |
| 8,406,081 B2 | 3/2013 | Xia et al. | |
| 2002/0013687 A1 | 1/2002 | Ortoleva | |
| 2004/0199330 A1 | 10/2004 | Routh et al. | |
| 2008/0162100 A1 | 7/2008 | Landa | |
| 2008/0177686 A1 | 7/2008 | Buyuktosunoglu et al. | |
| 2009/0003203 A1 | 1/2009 | Chen et al. | |
| 2009/0007141 A1 | 1/2009 | Blocksome et al. | |
| 2009/0157367 A1 | 6/2009 | Meyer et al. | |
| 2009/0323469 A1 | 12/2009 | Beasley | |
| 2010/0016235 A1 | 1/2010 | Kroemer et al. | |
| 2010/0054082 A1* | 3/2010 | McGarry et al. | 367/53 |
| 2010/0088035 A1 | 4/2010 | Etgen et al. | |
| 2010/0202250 A1 | 8/2010 | Kitchenside et al. | |
| 2011/0108283 A1 | 5/2011 | Srnka et al. | |
| 2012/0316791 A1* | 12/2012 | Shah et al. | 702/14 |
| 2012/0316844 A1 | 12/2012 | Shah et al. | |

OTHER PUBLICATIONS

Kermani et al., entitled "Virtual Cut-Through: A New Computer Communication Switching Technique," Computer Networks, vol. 3, pp. 267-286, Sep. 1979.

Symes, "Reverse Time Migration with Optimal Checkpointing", The Rice Inversion Project, Department of Computational and Applied Mathematics, Rice University, Houston, TX 77005-1892 USA, 2007.

Araya-Polo et al., "3D seismic imagining through reverse-time migration on homogeneous and heterogeneous multi-core processors", Scientific Programming, vol. 17 (2009) pp. 185-198,.

Brossier et al., "Two-dimensional seismic imagining of the Valhall model from synthetic OBC data by frequency-domain elastic full-waveform inversion", SEG Houston 2009 International Exposition and Annual Meeting (2009), Oct. 25-30, 2009, pp. 2293-2297.

Vigh et al., "3D prestack plane-wave, full-waveform inversion", Geophysics, vol. 73, No. 5, Sep.-Oct. 2008, pp. VE135-VE144.

Virieux et al., "An overview of full-waveform inversion in exploration geophysics", Geophysics, vol. 74, No. 6, Nov.-Dec. 2009, pp. WCC127-WCC152.

Abdelkhalek et al., "Fast Seismic Modeling and Reverse Time Migration on a GPU Cluster", HPCS '09, 2009, pp. 36-43.

Adiga et al., "Blue Gene/L torus interconnection network," IBM Journal of Research and Development, vol. 49, No. 2/3, Mar./May 2005, pp. 265-276.

Yu et al., "Scalable End-to-End Parallel Supercomputing and Application to Real-time Earthquake Modeling," Analytics Challenge Award, SC06, Tampa, FL, Nov. 2006.

Zhou et al., Barcelona'10, 72nd EAGE Conference & Exhibition incorporating SPE EUROPEC 2010Barcelona, Spain, Jun. 14-17, 2010.

Cullick et al., "Optimizing Multiple-Field Scheduling and Production Strategy with Reduced Risk", PSE 84239, 2003, 12 pages.

Office Action dated Mar. 31, 2014 received in a related U.S. Appl. No. 13/362,754.

Office Action dated Jul. 2 2014 received in a related U.S. Appl. No. 13/363,966.

Office Action dated Jul. 9, 2014 received in a related U.S. Appl. No. 13/364,054.

Office Action dated Jul. 24, 2014 received in a related U.S. Appl. No. 13/363,999.

* cited by examiner

RTM SEISMIC IMAGING WITHOUT SCRATCH DATA STORAGE SYSTEM AND METHOD

CROSS REFERENCE TO RELATED APPLICATIONS

This application claims priority under 35 U.S.C. §119(e) of U.S. Provisional Patent Applications Ser. Nos. 61/495,892, filed Jun. 10, 2001, the disclosure of which is hereby incorporated by reference in its entirety.

This application relates to commonly-owned, co-pending U.S. Patent Application Ser. Nos. 61/495,880, filed Jun. 10, 2011, 61/495,876, filed Jun. 10, 2011, 61/495,886, filed Jun. 10, 2011, the whole contents and disclosure of each of which is incorporated by reference as if fully set forth herein.

The present invention relates generally to seismic imaging systems and processes, and particularly, to improvements related to systems and processes for Reverse Time Migration (RTM) seismic imaging.

BACKGROUND

Seismic imaging is the process of converting acoustic measurements of the Earth into images of the Earth's interior, much like ultrasound for medical imaging. It is widely used in oil and gas exploration and production to identify regions that are likely to contain hydrocarbon reservoirs and to help characterize known reservoirs to maximize production. These methods have become critical to the energy industry as known reserves are used up and new reserves become increasingly difficult (and expensive) to find and are increasingly in technically challenging areas, like the deep sea. For the past several decades, the energy industry has tried to balance the need to image quickly and the need to image accurately. The need for accuracy is driven by the high cost of drilling a "dry" well due to poor imaging (a deep sea well can cost over $100 million) and the need for quick imaging is driven by the cost of not finding new reserves (i.e., bankruptcy). To minimize these costs, the industry relies on supercomputing clusters and regularly increases compute power, enabling both faster imaging on existing algorithms and the practical implementation of more accurate imaging. Thus, the development of fast, efficient methods for imaging is of high importance to the industry.

Seismic imaging data varies widely depending on how and where the data is collected (e.g., on land, at sea, at the ocean surface, at the ocean floor, below ground, electromagnetically, etc). One data collection method in particular implements a towed hydrophone receiver arrays for ocean seismic data collection. The basic idea is shown in FIG. 1 depicting a ship 200 shown towing a 2D array 212 of hydrophones spaced about every 25 m on 1 to 16 trailed streamers. Every 15 or so seconds, an air cannon is fired into the water creating an acoustic wave, e.g., a shot 211 that propagates through the water and into the Earth. Reflections from various surface and subsurface boundaries cause echoes that reflect back and are recorded by each hydrophone in the array 212. The recording of a single hydrophone in time as a trace and the collection of traces for a single firing of the air cannon is called a common shot gather, or shot. As the ship 200 moves, a large set of spatially overlapping shots is recorded. Depending on the size of the survey region to be imaged, this data collection can take a month or more and is designed to get the maximal coverage of the area to be imaged. The receiver data R(x, y, z, t) collected for potentially hundreds of thousands of shots is the result of some source data S(x, y, z, t) at a particular location.

A sample of artificial shot data is shown in FIG. 2 showing a sample shot data 215 for a 1D array of hydrophones showing time on the Y-axis and spatial offset on the X-axis. The direct source signal propagates out linearly in time (from the center of the array) and appears as straight lines 216. The recorded reflections appear as curved lines 218.

Two critical requirements drive production seismic imaging: The need for improved imaging to accurately locate and characterize elusive oil and gas reservoirs; and the need for timely subsurface imaging. Drilling too soon risks expensive dry wells while drilling too late risks delaying the time to oil. To minimize these risks, the industry regularly increases the power of its supercomputing clusters, enabling both faster imaging on existing algorithms and the practical implementation of more accurate imaging. However, raw supercomputing power is not enough. It is equally important—if not more so—to implement algorithms efficiently based on a detailed knowledge of the hardware.

The Reverse Time Migration (RTM) algorithm (see, e.g., Zhou, H., Fossum, G., Todd, R. and Perrone, M. 2010 Practical VTI RTM in *Proceedings of 72nd EAGE Conference*) is widely used in the industry because of its superior imaging accuracy for difficult subsurface structures like salt domes which are poorly imaged by other algorithms but which are very effective at trapping oil and gas. Several variants of RTM exist with differing degrees of approximation to reality, all of which use single-precision arithmetic.

Historically seismic imaging has processed shot gathers individually on a single compute node so that they could be processing in parallel. This approach has many benefits; but for algorithms like RTM, as computational power increases, data I/O becomes the single largest performance bottleneck, particularly when the model is large.

The RTM algorithm arises from the observation that pressure waves should be correlated at reflection boundaries; so RTM proceeds by correlating two pressure waves (called the forward and backward waves) to find those boundaries. To generate the waves for correlation, RTM simulates wave propagation using the wave equation below for a wave U(x, y,z,t) with a source term S(x, y, z, t):

$$\frac{1}{c^2}\frac{\partial^2 U}{\partial t^2} = \frac{\partial^2 U}{\partial x^2} + \frac{\partial^2 U}{\partial y^2} + \frac{\partial^2 U}{\partial z^2} + S \quad \quad 1)$$

The forward wave is the wave generated from the air cannon firing and propagating forward in time using a "velocity model" represented by C(x,y,z), which specifies the wave velocity at each point in space and represents the various material properties and boundaries of the volume being imaged. The air cannon firing is treated as a wavelet impulse localized in time and space. The backward wave is generated by using the shot data recorded by the hydrophone array as the source term for the wave equation and propagating that backward in time. These two waves are then multiplied point-wise at each time step to generate an image, using the following "imaging condition":

$$I(x,y,z) = \Sigma_t U_{Forward}(x,y,z,t) U_{Backward}(x,y,z,t) \quad \quad 2)$$

This process is repeated for all shots in the seismic survey and the images generated are summed to create a final image of the reflecting boundaries, which represent the subsurface structure. It is important to note that the time summation in the imaging condition implies that the first time step of the forward wave needs to be correlated with the last time step of the backward wave. This constraint is typically handled in one of two ways: either the forward wave is saved to disk (called a "snapshot") every several time steps and read in for imaging when the backward wave is computed, or the forward propagation is run twice—once forward in time and once in reverse time using boundary data saved from the forward pass to recreate the forward pass in reverse—and then imaging proceeds with the backward wave and the reverse forward wave.

The first method requires significant disk storage and can be bottlenecked on disk I/O, while the second requires 50% more computation and additional memory space to save the boundary data. Following standard practice in the industry as described in Zhou, et al. 2010, the wave propagation of Equation (1) is simulated using the finite difference approximation in formula (3) where there is selected the coefficients to implement $2^{nd}$ order accuracy in time and $8^{th}$ order accuracy in space. These coefficients are scaled to satisfy the CFL condition (Courant Friedrichs Lewy http://en.wikipedia.org/wiki/Courant%E2%80%93Friedrichs%E2%80%93Lewy_condition). This approach gives rise to a stencil shown in FIG. 3 which depicts a 25-Point spatial stencil 220 with 8th order accuracy shown in isolation on the left and the stencil 222 as it moves along the stride-1 dimension of the model.

$$U_{i,j,k,t+1} = 2U_{i,j,k,t} - U_{i,j,k,t-1} + C_{i,j,k}^2 \sum_{n=-4}^{n=4} (A_{xn}U_{i+n,j,k,t} + A_{yn}U_{i,j+n,k,t} + A_{zn}U_{i,j,k+n,t}) \qquad 3)$$

Where the A's are the stencil coefficients and can be determined using known methods and subscripts i, j, k are the indices of a pointing a 3D velocity model. In practice, the size of production RTM models varies widely, but the universal desire is to grow models larger to get more resolution and to run the models longer to enable deeper imaging since echoes take longer to reflect from deeper structures.

Typically, velocity models for individual shots are $512^3$ to $1024^3$ elements or larger and the number of time steps can be 10,000 or more in both the forward and backward propagation phases. Seismic imaging is typically computed using single precision arithmetic.

Industrial implementations of RTM are embarrassingly parallel. They typically run individual shots on one to two nodes of a compute cluster and run many shots in parallel, e.g., one shot per slave node, as shown in FIG. 4. These clusters have minimal network connectivity because it is not needed: the individual shots run independently and asynchronously. A simple work queue is used to manage runs and if a run for a shot fails, it is simply re-run, as it doesn't impact any of the other runs. A master process running at node 230 manages the work queue and to merge the partial images that are generated from each shot. Additionally, other image processing (not shown) might be included in this process.

As shown in FIG. 4, a velocity model V( ) 225 is conceptually depicted with each sub-block 28 representing a sub-set of the model data corresponding to a single shot. For calculating an image, the entire model is not needed, e.g., a sub-set of the model is used for a selected shot. A master processing node 30 in communication with a memory storage device, e.g., database 235, is programmed to allocate a RTM compute cluster 240 including a plurality of slave nodes 245, each node 245 having a corresponding memory storage device 250. Each slave node 245 is in communication with the master node 230 and is configured to obtain and process the single shot data 228a. When a (forward or reverse) pressure wave and resulting image is calculated at a respective node, it is stored to the main memory storage disk 250. Memory storage devices 250 that store intermediate results data in calculating the forward or reverse pressure wave which values are used to calculate resulting image are referred to as "Scratch" disks. RTM compute clusters 40 have significant per-node scratch disk requirements for saving snapshot data, which for a $1024^3$ model and 10,000 time steps would require 40 TB of snapshot storage—per shot. In practice, snapshot sub-sampling is used to reduce both disk requirements and disk I/O bottlenecks; however sub-sampling results in image degradation and must be balanced with performance. Compression can be used to trade computation for disk I/O, but if lossy, compression can also degrade image quality.

The velocity model 225 is the representation of the velocity of the wave traveling at an x, y, z coordinate in the sub-surface of the earth, and, for purposes of description, is referred to as $V^2$. As velocity model 225 is not known in the RTM process, an imaging condition enables the snapshot of the wave at a particular point in time after calculating forward wave and backward waves. For every value of t there is produced an image from an average of many shots. When averaging many shots, the image at a coordinate at a time t, i.e., I(x, y, z) is obtained via the imaging condition according to:

$$I(x,y,z) = \Sigma_t P_S(x,y,z,t) P_R(x,y,z,t) \qquad 4)$$

where $P_S(x, y, z, t)$ is the reflected forward power pressure wave at a coordinate and $P_R(x, y, z, t)$ is the reverse power pressure wave at an x, y, z coordinate at a time t. In a high-level aspect the forward motion calculation, the velocity model v(x,y,z) is loaded, the pressure wave is loaded at time t and the previous pressure wave at time t−1, i.e., P(x,y,z,t−1), and the next pressure wave P(x,y,z,t+1) is computed (bootstrap) and is stored. This process is performed at each iteration (time step t). The wave field is a 3-D object and is very large (e.g., on the order of $1024^3$ elements). Thus, for example, at four bytes of data for each calculation, this may amount to 4 GBytes of data for 1 time step of the algorithm for a single shot) and there may be thousands of time steps amounting to over 24 TB of data for a single shot which, when sent out to disk, is time consuming. Thus in practice, in an effort to reduce the data, the data is not stored or calculated at every time step, i.e., the calculated $P_S(x,y,z,t)$ is either stored or loaded to disk every $N^{th}$ iteration.

Standard finite difference RTM is implemented as follows: (1) Compute the (forward) wave equation with shot source terms, saving "snapshots" of the entire wave field to disk every Nth time step; and (2) Compute the (reverse) wave equation with receiver source terms, reading in corresponding forward wave field snapshots and computing an imaging condition to incrementally generate an image. This process is repeated for each shot and the resulting images are merged to generate a final image. RTM has several variants depending on the complexity of the wave equation used (e.g., isotropic, VTI (Vertical Transverse Isotropy), TTI, (Tilted Transverse Isotropy). Analysis of RTM codes suggest that typically computation is not the performance bottleneck for these algorithms but rather the movement of data, particularly on and off disk, is the primary performance bottleneck. So it is essential that close attention be paid to the movement of data in order to develop fast RTM applications.

As FLOPS per processor increase, the prior art parallel implementations become disk I/O bound. It is possible to improve performance by partitioning single shot gathers over multiple nodes; however, such implementations typically use only a handful of nodes. Furthermore, in the prior art implementations, the inter-processor or node communications are severely limited by their bandwidth and thus results in large latency.

SUMMARY

It is desired to provide a system and method that includes replacing a parallel implementation of an RTM imaging problem with a synchronized, communication intense, massive domain-partitioned approach.

In one aspect, there is provided an RTM implementation that extends domain partitioning over thousands of nodes on a distributed processor/memory supercomputer and results in increased performance improvements.

Thus, according to one aspect, there is provided a system, method and computer program product for creating an image of sub-surface formations in a defined 2D or 3D volume of a geological structure. The method comprises: partitioning a velocity model domain representing geophysical wavefield propagation characteristics of a sub-surface structure of the earth in the defined volume into a plurality of blocks, each block having an associated processing task for processing wave data; receiving, at an array of receiver devices at a surface of or within the defined volume, data representing measurements of each wave produced by a shot of a sequence of plural shots; and assigning each partitioned domain block to one or more processing nodes of a distributed processing highly parallel computer device having a plurality of processing nodes interconnected through one or more communication networks; computing in parallel, using the associated processing tasks at each the processing node, data representing contributions of forward wave propagation data and reverse wave propagation at that node using the shot data; storing some or all of the forward wave snapshot data in a local memory storage device at each respective the node; and, using the computed forward wave propagation data and reverse wave propagation data contributions stored at each node to form an imaging condition from which an image of sub-surface formations is created.

Further to this aspect, the processing of a partitioned domain block at each node comprises: calculating current forward wave propagation data from the recorded source wave data at predetermined time steps; storing the current forward wave propagation data in a local memory storage device associated with the node; calculating second forward wave propagation data in a local memory storage device associated with the node at the predetermined time steps in reverse order, the calculating using the current forward wave data communicated from neighboring partitioned domain blocks stored in an associated local memory storage device of neighboring nodes; calculating the reverse wave propagation data representing reverse propagating waves in the volume using the calculated second forward wave propagation data; computing, using the second forward wave propagation data and reverse wave propagation data, an image at each node; and, summing the computed images from each node to create a final image of reflecting boundaries, which represent the subsurface formations.

In a further aspect, a system for creating an image of sub-surface formations in a defined volume of a geological structure comprises: an array of receiver devices at or within said defined volume for recording data representing measurements of each wave produced by a shot of a sequence of plural shots; a distributed processing highly parallel computer device having a plurality of processing nodes interconnected through one or more networks, each node having a respective processor device and a local memory storage device associated with the respective processor device, wherein one or more said processing nodes is assigned a processing block representing one partition of a partitioned velocity model domain representing geophysical wavefield propagation characteristics of a sub-surface structure of the earth in said defined volume, each processing block having an associated processing task for processing wave data associated with a shot; wherein a processor device at each node is configured to perform, in parallel, a method comprising:

computing in parallel, using said associated processing tasks at each said processing node, data representing contributions of forward wave propagation data and reverse wave propagation at that node using said shot data;

storing some or all of said forward wave snapshot data in a local memory storage device at each respective said node; and, using said computed forward wave propagation data and reverse wave propagation data contributions stored at each node to form an imaging condition from which an image of sub-surface formations is created.

In a further aspect, the processing device at each node is further configured to perform: calculating current forward wave propagation data from a wavelet representing a model of a source wave at predetermined time steps; the calculating using the current forward wave data communicated from neighboring partitioned domain blocks stored in an associated local memory storage device of neighboring nodes; storing snapshots of calculated results of the current forward wave propagation data at one or more time instances in a local memory storage device associated with the node; calculating the reverse wave propagation data representing reverse propagating waves in the volume using the receiver data; computing, using the stored forward wave propagation data and reverse wave propagation data, an image at each node; and, summing the computed images from each node to create a final image of reflecting boundaries which represent the subsurface formations.

Advantageously, in one embodiment, an RTM implementation extends domain partitioning over thousands of nodes on a particular computing system referred to as Blue Gene® supercomputer ("Blue Gene") (trademark of International Business Machines Corp., Armonk N.Y.). The RTM implementation method running in the Blue Gene® system uses its aggregate memory as a high performance data fabric for handling intermediate data in Reverse Time Migration (RTM) seismic imaging process thereby alleviating the disk storage requirements in conventional RTM processing and thus reducing the cost of the system.

A computer program product is provided for performing operations. The computer program product includes a storage medium readable by a processing circuit and storing instructions run by the processing circuit for running a method. The methods are the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

A system and method is described for operation in a distributed-memory supercomputer using a network as a high performance data communication mechanism for partitioning each shot gathered among a subset of the computing nodes and performing RTM seismic imaging in a collaboration fashion.

While several variants of RTM seismic imaging exist with differing degrees of approximation to reality, in one embodiment, for purposes of discussion, it is assumed that there is implemented isotropic, acoustic RTM which assumes the wave velocity is independent of wave direction and that no energy is absorbed by the medium.

In one example embodiment, the present system and method operates in a massively parallel computing system such as the Blue Gene® (available from International Business Machines, Inc.) computing system.

The method implemented in the Blue Gene System® uses its aggregate memory as a high performance data fabric for handling intermediate data in Reverse Time Migration (RTM) seismic imaging process thereby alleviating the disk storage requirements in conventional RTM processing and thus reducing the cost of the system.

The total aggregate memory of the Blue Green® computing system is distributed in the style of a multi-computer. With each compute node supporting up to 4 GB physical memory, a rack of the Blue Gene® system can have up to 4 TB aggregate memory.

The Blue Gene® system makes use of its torus network configuration as a high performance data communication mechanism for partitioning each shot gathered among a subset of the Blue Gene® nodes and performing RTM seismic imaging in a collaboration fashion. Processing performance is improved by alleviating disk I/O operations during the course of the RTM processing.

Figure 6:
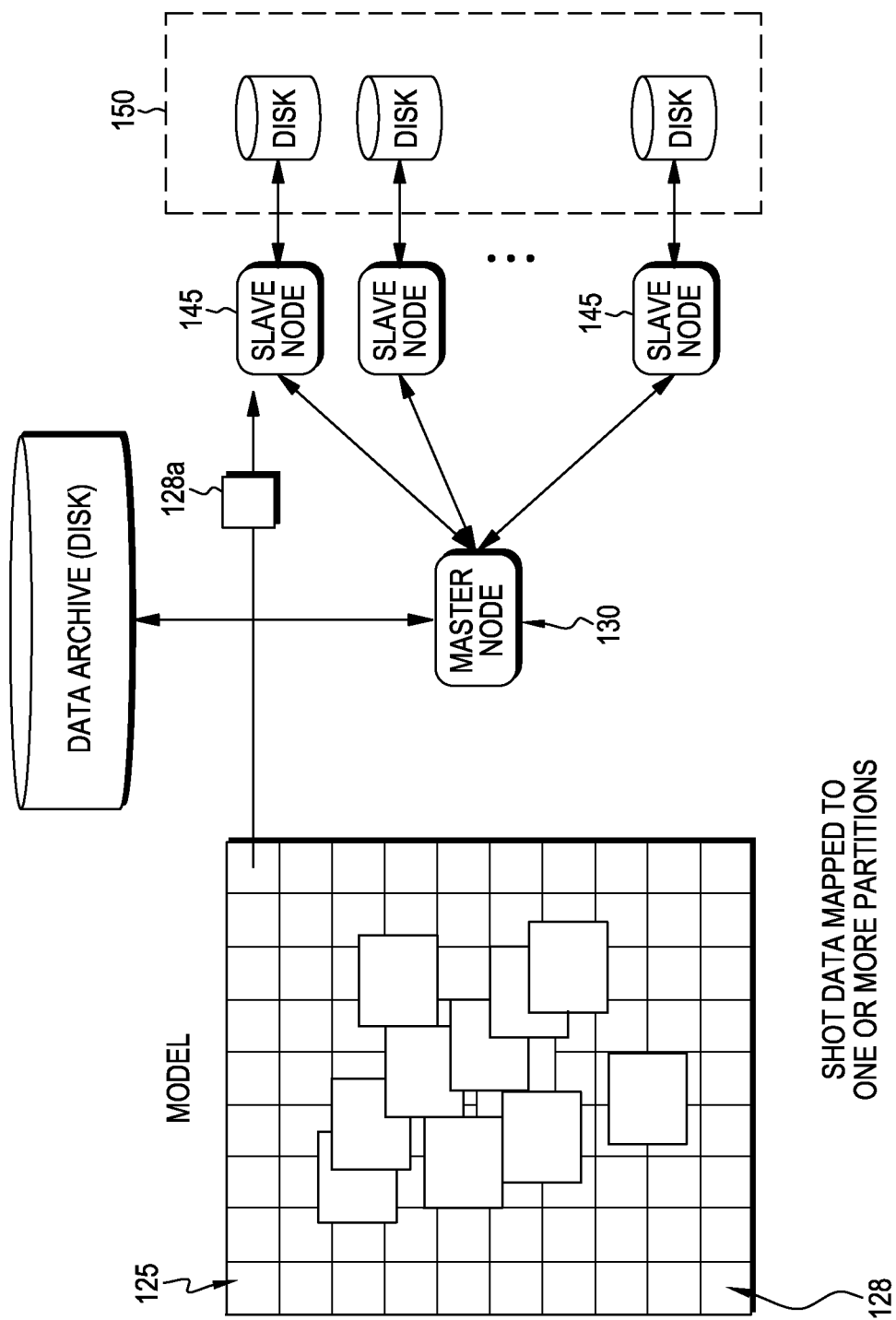
FIG. 6 depicts the velocity model being partitioned into indivisible objects that each are individually assigned to a respective slave node for handling memory storage operations locally in one embodiment.

Referring to FIG. 6 there is depicted the velocity model 125 that is partitioned into indivisible objects 128 that each individually is assigned to a respective slave node 145 in the Blue Gene® system, using any of a variety of known algorithms. Any shot data within that object is thus assigned to and processed by that slave node. In one embodiment, the partitioning of the velocity model 125 is performed according to a uniform spatial partitioning scheme, in which each dimension of the model is divided into equal- or approximately equal-sized groups of points creating the blocked structure shown in FIG. 6A. Null padding of dimensions can be used to assure that each block is exactly the same size. In another embodiment, the partition can be done non-uniformly so as to balance the amount of work required for each block. The configurability of the partitioning may be motivated by a minimizing the run time. In such an embodiment, the block would not be necessarily be the same size. The specific choice of non-linear partition can be driven by profiling of particular code implementations.

Rather than processing each shot data in parallel, a slave node 145 receives data 128a from multiple shots, i.e., shots (shot data) being partitioned among the slave nodes 145 of a cluster. Via partitioning, the velocity model (e.g., amounting to over 24 TB of data memory required for processing a single shot with a model order of $1024^3$ which may amount to ~4 GBytes of data for 1 time step of the RTM imaging algorithm for a single shot per slave node and there may be thousands of time steps)) is thus divided, e.g., amongst "n" slave nodes 145; therefore, for example, for n=1000 slave nodes, with partitioning, each slave node would need only enough memory to process its assigned part of the velocity model (e.g., 4 MB of the model) with data requirements of only 24 GBytes per node. Thus, via partitioning, each slave node 145 has enough local memory to manage processing of the velocity model portion without having to store data in the scratch disk. That is, the entire model is kept in memory at each slave node, obviating the need for scratch disk, and the attendant disk-bandwidth bottleneck. In Blue Gene® supercomputer implementations the bandwidth to main memory on the computer governs (e.g., 10 MB/sec) such that one (1) rack of a Blue Gene® computer, can process data of a $512^3$ velocity model data in about 30 sec.

That is, as described in greater detail below, in one embodiment, there is performed domain partitioning for seismic imaging to improve the overall run-time performance of the seismic imaging system. In one embodiment, an example process of domain partitioning implemented by a computing device, for example, includes: 1) defining a domain (e.g., a cubic velocity model of size $N^3$ elements) or some complex shape); 2) dividing that domain, using methods known to those skilled in the art, into two or more distinct or overlapping subsets; 3) processing each subset of the domain on a separate node of a supercomputer. For example, the processing may include a physical simulation like for seismic imaging or any other supercomputing calculation; 4) synchronizing the nodes so that all calculations have completed; 5) communicating information between nodes (sometimes to all nodes, sometimes to a fixed subset (like nearest neighbors) and sometimes to a dynamic subset that changes with each iteration—depending on the algorithm that is being run— e.g., RTM using nearest neighbors); and, 6) iterating over steps 1-5 as many times as is needed. Generally steps 1 and 2 are not repeated. It should be understood that alternative to a cubic velocity model of size $N^3$ elements 1-Dimensional and 2-Dimensional versions may be used and follow the same algorithm.

Figure 5:
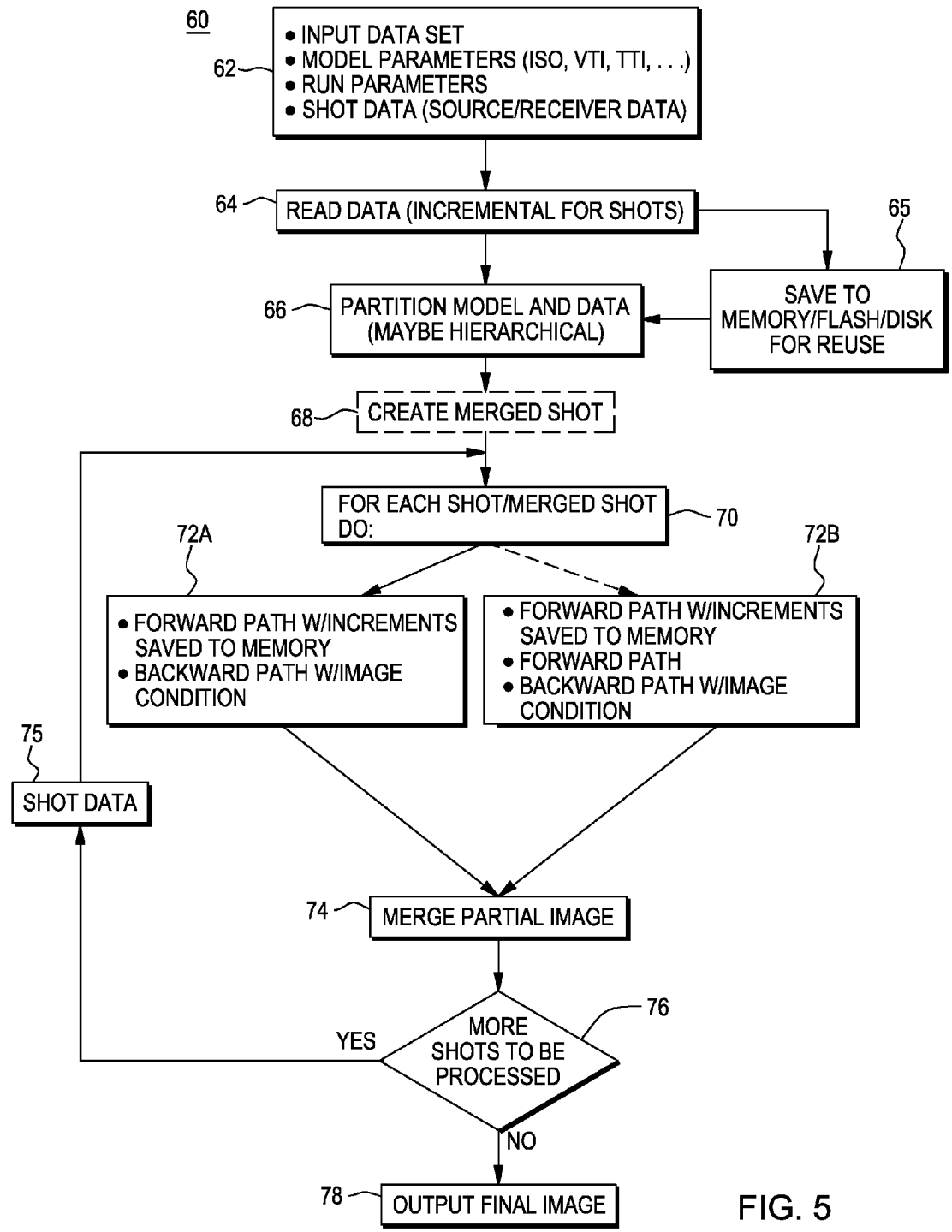
FIG. 5 depicts a method for calculating the RTM imaging condition according to a one embodiment.

FIG. 5 depicts a method 60 for calculating the RTM imaging condition in a massively parallel computing system according to a one embodiment. As mentioned, one implementation includes the Blue Gene® computing system. First, at 62, there is input to the nodes of the system a data set including the velocity model v(x,y,z) and associated model parameters (e.g., Isotropy, VTI, TTI) which are loaded to the respective local node memories. The parameters are run to configure the node for the RTM seismic imaging processing. For example, theses may include the code execution parameters, i.e., the model size (e.g., the size(s) of the model partitioning as determined by details of the hardware implantations—e.g., IBM Power7, BlueGene®, Intel Xeon Westmere clusters, etc.), the iteration numbers, the snapshot frequency, etc. Further input as part of data set are the Shot Data (Source/Receiver Data); the source data being created by an air cannon or other noise source but is modeled at each node using a "wavelet" (a finite wave that can be represented in numerous ways) as known to those skilled in the art. There are many specific wavelets that can be used, e.g., a Ricker wavelet in one implementation (http://en.wikipedia.org/wiki/Mexican_hat_wavelet). The receiver data on the other hand is specifically recorded using the recording devices and it is these measurements that are used in the backward processing stage as input.

After configuring the domain partitioned nodes at 62, the source and receiver data are read from the storage device, whether external disk or locally. Depending upon the method, the embodiment considers that shot data may be incrementally obtained, e.g., according to a predetermined period or time interval. For example, shot data for that node may be obtained every k time steps.

Then, in a further step 64, the data is read as needed by the node. Data is read incrementally (i.e., the data is read as needed, not as the whole), and is usually read at shot frequency or subshot frequency, e.g., every 1, . . . , n time steps. Data is read from where the data is stored, e.g., local storage, and at 65, distributed for processing at each node. In one aspect, all the data (e.g., including input data, receiver data, temporary calculations results, or intermediate result data) is stored to local memory storage (e.g., RAM, DD-RAM) at each compute node of the massively parallel system. However, in alternate embodiment, these types of data may be stored in a flash memory available at each node of the massively parallel system and/or may be stored in the node's associated scratch disk. It is understood that alternate embodiments contemplate various combinations of data storage as well, wherein data may be stored in each memory mode (local node memory, flash and/or disk).

At 66 there is performed partitioning of the model, i.e., the model space/data is partitioned into sub-spaces for the multiple nodes to process them in parallel. In an alternate embodiment, a hierarchical scheme may be implemented in which RTM processing progresses to obtain images at varying levels of detail, based on partition (model) sizes as will be described in greater detail herein below.

The next sequence of steps describes the processing at each node after the partitioning.

Continuing to 68, in an alternate embodiment that considers combining shot data such as described in herein incorporated commonly-owned, co-pending Patent Application Ser. No. 61/495,880, filed Jun. 10, 2011, there may be performed the step of merging the read shot data. This may include various steps that combine some or all shots from a seismic survey to form a metashot(s) in which an RTM algorithm may be used to process the resulting set of shots and/or metashots. This may further include: adding using only metashots (or a subset of the shot data); adding using unique shots for each metashot (a shot is never added to a metashot more than once); adding using a unique metashot for each shot (no shot used in more than one metashot); adding including a variable weighting factor when shots are combined into a metashot; adding using all shots combined into a single metashot; adding using combining shots as if they were all recorded at the same time; adding by combining shots with a time lag; adding by combining on a pre-specified grid for each time step; adding using a smoothing function to distribute the recorded data to the pre-specified grid. It is understood that a combination may include a linear superposition of the recorded waves a nonlinear superposition.

Continuing to 70, a processing loop is entered in which there may be performed the RTM seismic imaging algorithm in accordance with one of two alternate embodiments 72A, 72B as will be described in greater detail herein below. Each of the RTM image data processing methods 72A, 72B seek to achieve an imaging condition of the sub-surface formations by calculating forward and reverse components of the propagating wave. Each of these steps, described herein with respect to FIGS. 7A, 7B preferably employ local memory storage for storing locally at the node memory, computed forward propagating wave components, however, can utilize local flash memory at the node and/or the attached scratch disk for the temporary storage.

Continuing to 74, as a result of forward and backward propagating wave processing implemented at 72A or 72B, the resulting partial images are merged to obtain the completed image. Continuing to 76, as the processing depicted in FIG. 5 may be performed over multiple shots, a determination is made as to whether there are any more shots to be processed. If there are more shots to be processed, then the process continues by returning to step 70 and repeating steps 72A or 72B and 74, 76, however, using additional or new shot data obtained at 75 as shown in FIG. 5. Otherwise, at step 76, if it is determined that there are no more shots (no more shot (or metashot) data) to be processed, the process concludes by outputting the final image at step 78.

Figure 7A:
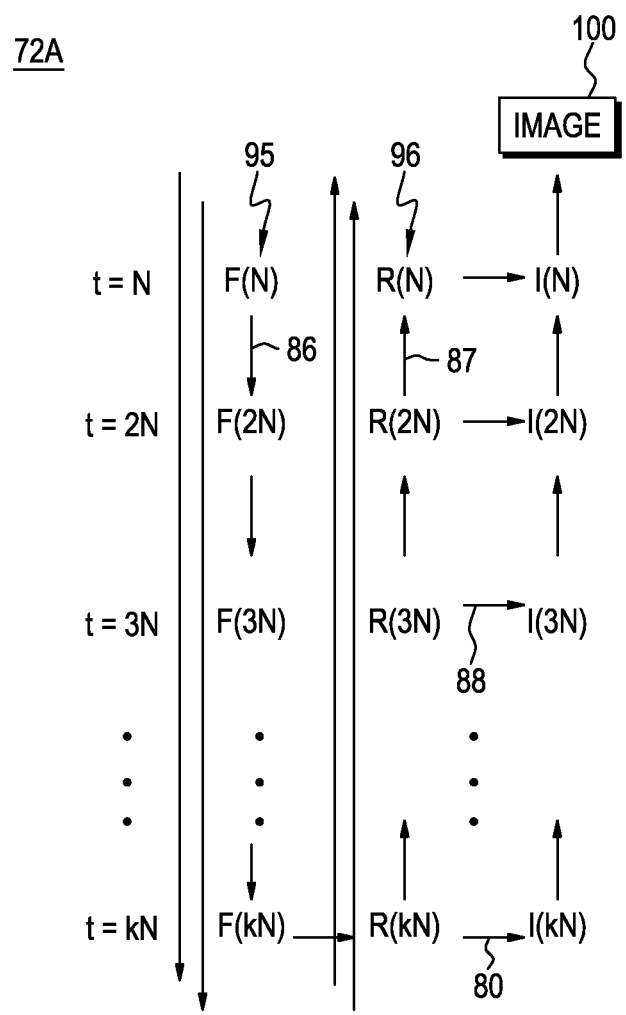
FIG. 7A depicts a first embodiment of the model for calculating the imaging condition using massively parallel computing system with local node memory storage according to one embodiment.
Figure 7B:
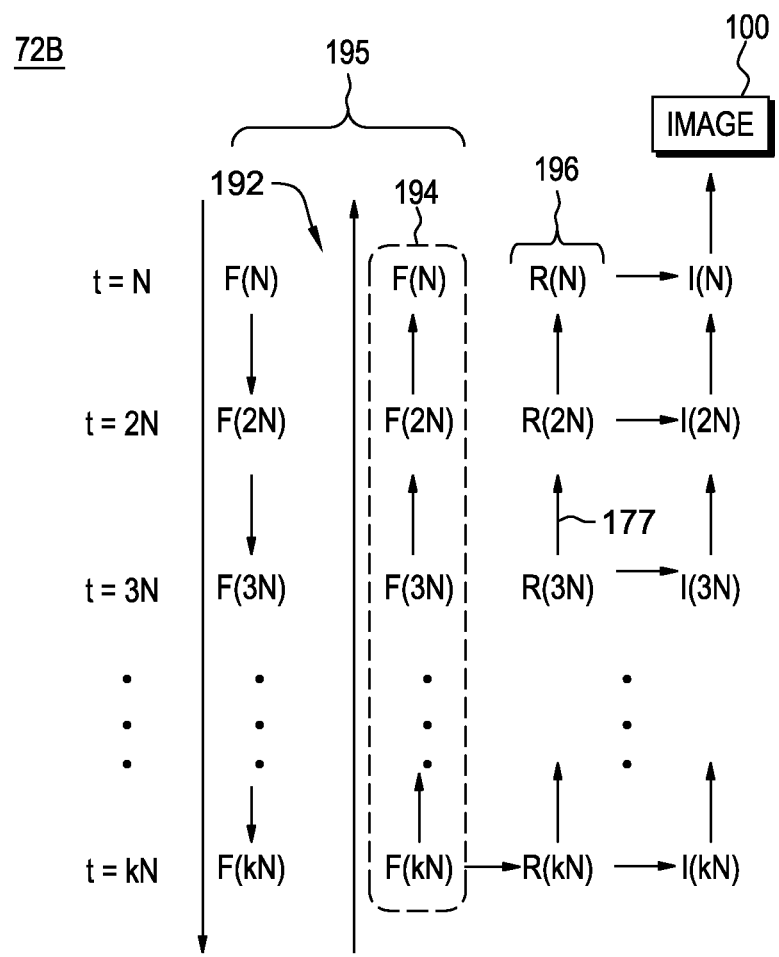
FIG. 7B depicts a second embodiment of the model for calculating the imaging condition using massively parallel computing system with local node memory storage according to one embodiment.

Referring back to step 70, in which a processing loop is entered in which there may be performed the RTM seismic imaging algorithm, FIG. 7A describes the processing according to alternate embodiment 72A, and FIG. 7B describes the processing according to alternate embodiment 72B.

In FIG. 7A, there is calculated forward propagation pressure wave, $P_S(x,y,z,t)$ at every $N^{th}$ timestep. The reflected forward power pressure wave $P_S(x,y,z,t)$ calculation at every $N^{th}$ timestep is either stored and/or loaded to memory storage (alternately including storing to a flash memory and/or disk) every $N^{th}$ iteration in a forward propagation phase 95 of the algorithm 72A. Each $P_S(x,y,z,t)$ calculation step may include compressing the $P_S(x,y,x,t)$ and then, writing of $P_S(x,y,x,t)$ to memory. As shown in FIG. 7A, the forward pressure wave at every $N^{th}$ timestep is represented as functions F( ) and are calculated in forward order (e.g., time t=N->time t=kN) in the model, as depicted by arrows 86, and these calculations are first saved to associated local memory (e.g., cache). Then, there is calculated reverse propagation, $P_R(x,y,z,t)$ at every $N^{th}$ timestep. That is, in a reverse propagation phase 96, the backward or reverse pressure wave represented as function R( ) is calculated in reverse order according to the time steps, e.g., by using the forward pressure wave data (obtained starting at time t=kN down to time t=N) stored at the local node memory. As the imaging condition requires matching at the same time, then all forward calculations of the imaging are obtained before the reverse wave calculations are made. Thus, during the calculation of the reverse pressure wave data, all the values for the forward propagation are obtained first. The calculations performed in the reverse propagation phase 96 include calculating reverse power pressure wave $P_R(x,y,z,t)$ at every N timesteps according to the reverse time flow represented by arrows 87, which steps include reading the prior stored/loaded $P_S(x,y,x,t)$ from memory, decompressing $P(x,y,x,t)$ and calculating R( ) at that step. During these steps in reverse propagation phase 96 as depicted by arrows 88, there is further calculated the partial sum of the image, represented as function I( ) at each time step (in reverse order). For example, at step t=kN, the reverse propagation phase will include the calculating of the partial images I(kN) from the stored/loaded F(kN) and R(kN), I((k−1)N) values from stored/loaded F((k−1)N) and R((k−1)N) in reverse order, etc., until an image I(N) is computed. Then, at step 80, the final image I(x,y,z) 100 is computed by merging (combining) all the computed partial image values I(kN), I((k−1)N), ..., I(N).

Particularly, in view of FIG. 6, temporary data for partial images created at each respective slave node 145 are stored in the respective local node memory. Alternately, combinations of memory storage modalities may be used including local memory (cache, main memory) and/or a flash memory storage device and/or scratch disk device. This data are communicated to the master node 130, which images may then be averaged and the final resulting image is obtained and saved for a single shot or metashot.

Continuing to FIG. 7B there is depicted an model according to a further embodiment for calculating the imaging condition. As in the imaging algorithm 72A (FIG. 7A), there is first loaded the Velocity model v(x,y,z); source and receiver data. Then, in the forward propagation phase 195 of the algorithm, P(x,y,z,t), is calculated every N timesteps. However, as different from the imaging algorithm of FIG. 7A, the forward propagation phase 195 is passed twice: 1) once as indicated at time steps 192 for saving boundary data (instead of saving the snapshot of the whole volume in interest, exterior boundary values are saved and used to re-compute the interior value in the second pass); and, 2) once in "reverse" using the saved boundary data as indicated at time steps 194. That is, as shown in FIG. 7B, the forward pressure wave $P_S(x,y,z,t)$ at a timestep is represented as functions F( ) and is calculated in forward order (e.g., time t=N->time t=kN) in the model, and these boundary data calculations at steps 192 are written to cache memory local to the Blue Gene® slave computing node 145 every $N^{th}$ iteration thus avoiding the need for scratch disk as indicated by absence of disk storage units 150 as shown in FIG. 6.

As further shown in FIG. 7B during backward or reverse propagation phase 196 reverse pressure wave represented as function R( ) is calculated in reverse order in lock step with the "reverse" forward propagation pressure wave run obtained during time steps 194 (i.e., obtained starting at time t=kN down to time t=N). The calculations performed in the reverse propagation phase 196 include calculating $P_R(x,y,z,t)$ at every N timesteps occurs according to the flow represented by arrows 177, which steps include reading the prior stored/loaded $P_S(x,y,x,t)$ from local Blue Gene® node cache memory (RAM, or alternatively, RAM and flash memory, or RAM/flash and disk storage), decompressing P(x,y,x,t) and calculating R( ) at that step. During these steps in back propagation phase 196 as depicted by arrows 178, there is further calculated the partial sum of the image, represented as function I( ) at each time step (in reverse order). For example, at step t=kN, the reverse propagation phase will include the calculating of the partial images I(kN) from the stored F(kN) and R(kN), I((k−1)N) values from stored/loaded F((k−1)N) and R((k−1)N) in reverse order until I(N) is computed. Finally, at the last time step (in reverse, i.e., at time t=N in the example shown in FIG. 7B), the final image I(x,y,z) 200 is computed by merging (combining) all the computed partial image values I(kN), I((k−1)N), ..., I(N).

Particularly, referring back to FIG. 6, the temporary data for partial images created and stored in cache memory (RAM, and/or the flash and disk memory storage arrangements described) at each respective compute node 145 are communicated to the master node 130, which images may then be averaged and the final resulting image 200 obtained and saved for a single shot.

As mentioned, the Blue Gene® system is a distributed-memory supercomputer. The aggregate memory of the total machine is distributed in the style of multi-computer. With each compute node 145 (FIG. 6) supporting up to 4 GB physical memory, a rack of the Blue Gene® system can have up to 4 TB aggregate memory.

The system, method and computer program product for use in the Blue Gene® system uses its aggregate memory as a high performance data fabric for handling intermediate data in Reverse Time Migration (RTM) seismic imaging process.

In an example implementation, the RTM seismic imaging process may be performed on two racks of a Blue Gene/P (alternately referred to herein as "BGP") system such as described in Sosa, C and Knudson, B., 2009. IBM System Blue Gene Solution: Blue Gene/P Application Development, IBM Redbooks, http://www.redbooks.ibm.com/abstracts/sg247287.html.

Further details concerning the BGP system operation can be found in commonly-owned U.S. Pat. No. 7,761,687 entitled Ultrascalable Petaflop parallel supercomputer, the entire contents and disclosure of which is incorporated by reference as if fully set forth herein. For example, an implementation of a Blue Gene/P (BGP) supercomputer has 1024 nodes per rack, running at 0.85 GHz. Each node has 4 single-threaded cores, 4 GB of RAM per node (4 TB per rack) and an extremely high bandwidth, low-latency, nearest-neighbor 3D torus topology network in which each node is connected to each of its 6 nearest neighbor nodes by 850 MB/s of send+ receive bandwidth (i.e., 5.1 GB/s per node and 5.22 TB/s of communication bandwidth per rack). Because of this massive bandwidth, BGP is suited for physical modeling involving extensive nearest-neighbor communication and synchronization. The nearest neighbor latency for 32B data transfers is about 0.1 microseconds and is essentially amortized away for larger block transfers required by RTM. Each compute node core has a 32 KB L1 cache with a 32B cacheline and a shared 8 MB L3 cache with a 128B cacheline. Each node has two memory channels with an aggregate bandwidth of 13.6 GB/sec to main memory. BGP compute notes are connected via dedicated I/O nodes to a GPFS file system based on three DDN S2A9900 couplets attached to the BGP I/O nodes via 10 Gigabit Ethernet connections, providing ~16 GB/s of disk I/O bandwidth per rack. Each node can operate in SMP mode as a unit, or as four "virtual" nodes. The Virtual Node (VN) model avoids the need to explicitly use multithreading at the node level and thereby eases programmability. Each core has a 2-way SIMD unit.

Figure 8:
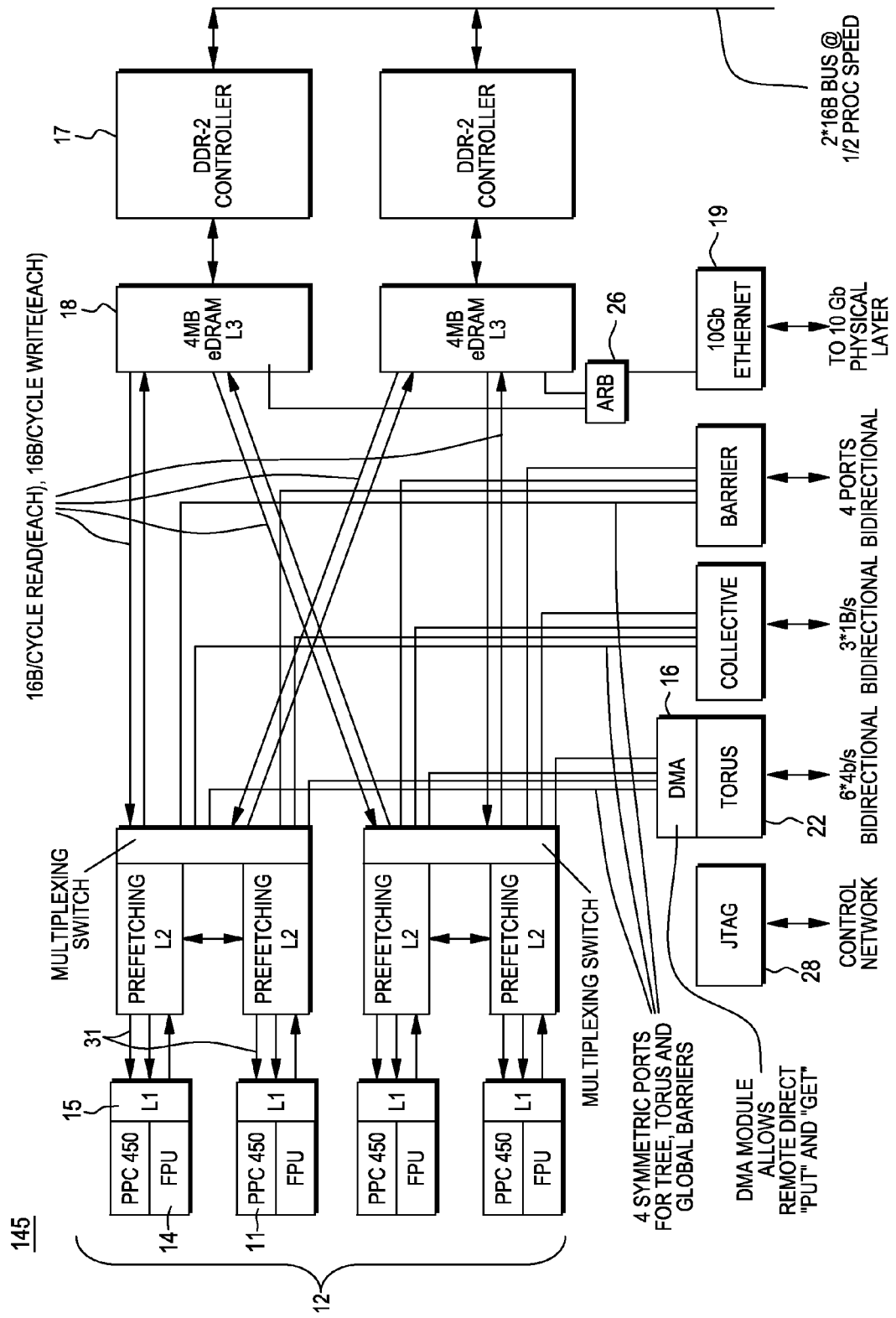
FIG. 8 depicts a node ASIC 10 for a massively parallel supercomputer such as may be implemented in the Blue Gene/P computing system for RTM seismic data processing; and, FIG. 9 depicts each compute node being connected to six (6) neighboring nodes via 6 bi-directional torus links as depicted in the three-dimensional torus sub-cube portion implemented by the Blue Gene/P computing system for RTM seismic data processing.

More particularly, FIG. 8 is a block diagram illustrating a single computing node ASIC 145 according to the principles of the invention. Each node preferably is based on the chip process that integrates all the functions of a computer into a single compute ASIC, enabling dramatic reduction of node size and power consumption. In a supercomputer, this can be further leveraged to increase node density thereby decreasing the overall cost/performance for the machine. As shown in FIG. 8, the ASIC of this design, which may function as both a compute node and an I/O node in the system, include four processing cores 11, each having a "double" floating point unit 14, that includes two coupled standard floating point units. This arrangement gives a peak performance of four floating point operations per processor core per clock cycle. The processor core is a PowerPC450 embedded core, e.g., available from International Business Machines, Inc. (IBM), although future versions of this core may be used as technology improves. A description of the functionality of the core may be found at http://www.ibm.com/chips/power/powerpc/. The "Double" FPU unit increases the data bandwidth by increasing the datapath from 64 bits to 128 bits to allow for quadword Floating Point loads and stores (i.e., data moving). Additionally, this ASIC unit has been architected to allow two floating point multiply-add instructions to be dispatched and executed in one cycle. The dual floating point pipelines allow for architected (single instruction, multiple data) instructions for complex number arithmetic. As an example shown herein below, consider a code fragment which performs an operation A*B+C on three complex numbers, A, B and C. Assume that prior to the computation, the registers ar and ai contain the real and imaginary parts of A, and similarly, the pairs br and bi, and cr and ci hold the values of B and C. A compiler would automatically be able to generate the following code, requiring just two instructions, which places the result into a register pair dr and di.

TABLE 1

Complex A * B + C on Double-FMA in SIMD Mode.

ar * br + cr → tr; ar * bi + ci → ti first FMA SIMD instruction
−ai * bi + tr →dr; ai * br + ti → di second SIMD instruction The node further incorporates other functions into the ASIC. Besides the embedded processing core and floating point cores, the system includes embedded DRAM 15, an integrated external DDR2 memory controller, a Direct Memory Access (DMA) module 16, 10 Gb Ethernet interface and associated functionality 19 as well as all the network link cut-through routing buffers and routing control block that allow any two nodes to communicate with low latency. The compute node in one embodiment includes four embedded cores 11, such as the PPC450, each capable of being utilized for message handling and computation operations.

As further shown in FIG. 8, virtual cut-through torus routing is supported in hardware block 22, which is integrated into the ASIC allowing for the elimination of the network adapter. Preferably, a virtual channel routing network is supported with two (2) dynamic and two (2) deterministic channels.

The details of DMA feature of the torus network may be found in the co-pending U.S. Pat. Nos. 7,788,334, 7,886,084, 7,694,035, 7,802,025, and U.S. patent application Ser. Nos. 11/768,682, 11/768,813.

As implemented in the massively parallel supercomputer of the invention having multiple nodes 145 as shown in FIG. 6, the direct memory access (DMA) engine 16 permits certain hardware sub-systems within a computer system to access system memory for reading and/or writing that is independent of the central processing unit, or compute nodes comprising processor(s) in the case of parallel computer system. A DMA transfer comprises functions for copying a block of memory (data) from one device to another within a computer or computer system, e.g., from system RAM to or from a buffer on the DMA device w/o interrupting the processor operation. The CPU initiates the DMA transfer, but the DMA carries out the task. Further use of the DMA 16 engine is made by disk drive controllers, graphics cards, network cards, sound cards and like devices.

Computer systems that employ DMAs and DMA message passing can transfer data to and from system devices with much less CPU overhead than computer systems constructed to message and pass data without a DMA engine or channel. For example, the BlueGene/P massively parallel supercomputer ("BGP supercomputer"), includes a DMA engine integrated onto the same chip as the processors (CPUs), cache memory, memory controller and network logic.

One operation facilitated by use of the DMA engine in the processing node is the sharing of reception and injection byte counters among the network slave (compute) nodes (for both computation and I/O tasks or applications) and respective processor core elements in the interconnected as a network. Each compute node, or I/O node comprising the parallel computer system includes a plurality of processors, memory and a DMA engine, constructed from a single ASIC such that DMA resources, e.g., DMA reception and injection byte counters, are limited. As such, the system provides that the processors and the DMA can write and read the shared byte counters in such a way that more outstanding messages can be supported by the DMA engine, and therefore the parallel computer system.

The ASIC nodes 145 (FIG. 8) comprising the parallel computer system that are interconnected by multiple independent networks optimally maximize packet communications throughput the system with minimal latency. As mentioned herein, in one embodiment of the invention, the multiple networks include three high-speed networks for parallel algorithm message passing, including the Torus with direct memory access (DMA), collective network, and a Global Asynchronous network that provides global barrier and notification functions.

Furthermore, at least four modes of operation are supported: the virtual mode, SMP 1-core mode, SMP 4-core mode, and a dual mode. In the virtual node mode, each of the processing cores will perform its own MPI (message passing interface) task independently. Each core uses approximately one-quarter of the memory (L3 and DRAM) of the compute node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth or dual mode is a hybrid case, wherein two SMP MPI tasks are running, with each SMP using 2 processor cores running a thread each. Finally, one can also support modes such as a 1, 3 split, and 1, or 2 or 3 cores idling. Thus a compute node can trade off amount of memory versus parallelism, a feature unique to this supercomputer, or parallel computer system.

Because of the torus's DMA feature, internode communications can overlap with computations running concurrently on the compute nodes. Also, complex forms of messaging protocols, particular arithmetic functions, often called "reduction functions", are invoked on message data as it arrives. One compute node core, or processor, may be designated to perform these functions without distracting computations on other processor cores. Additionally, because of the computational power of the I/O processor, the application is able to define arbitrarily complex reduction functions, supporting new algorithmic development that overlaps computational power with communication activities. For particular classes of parallel algorithms, or parts of parallel calculations, this architecture may apply the power of some or all cores at a particular compute node to work in collaboration on communication activities.

Further details regarding implementation of Blue Gene/P high performance computer can be found in Sosa, C and Knudson, B., entitled IBM System Blue Gene Solution: Blue Gene/P Application Development, IBM Redbooks, http://www.redbooks.ibm.com/abstracts/sg247287.html, 2009, the entire contents and disclosure of which is incorporated by reference as if fully set forth herein.

As mentioned, the nodes in the Blue Gene® system are interconnected through multiple networks. Each compute node (slave) 145 has six connections to the torus network. The torus network connects the nearest neighbors into a three dimensional torus. The torus network can be used for general purpose, point-to-point messaging passing and multicast operations to a selected class of nodes.

Further to the system and method in the Blue Gene® system, use is further made of torus network as a high performance data communication mechanism for partitioning each shot gather among a subset of the Blue Gene® nodes and performing RTM seismic imaging in a collaboration fashion.

Figure 9:
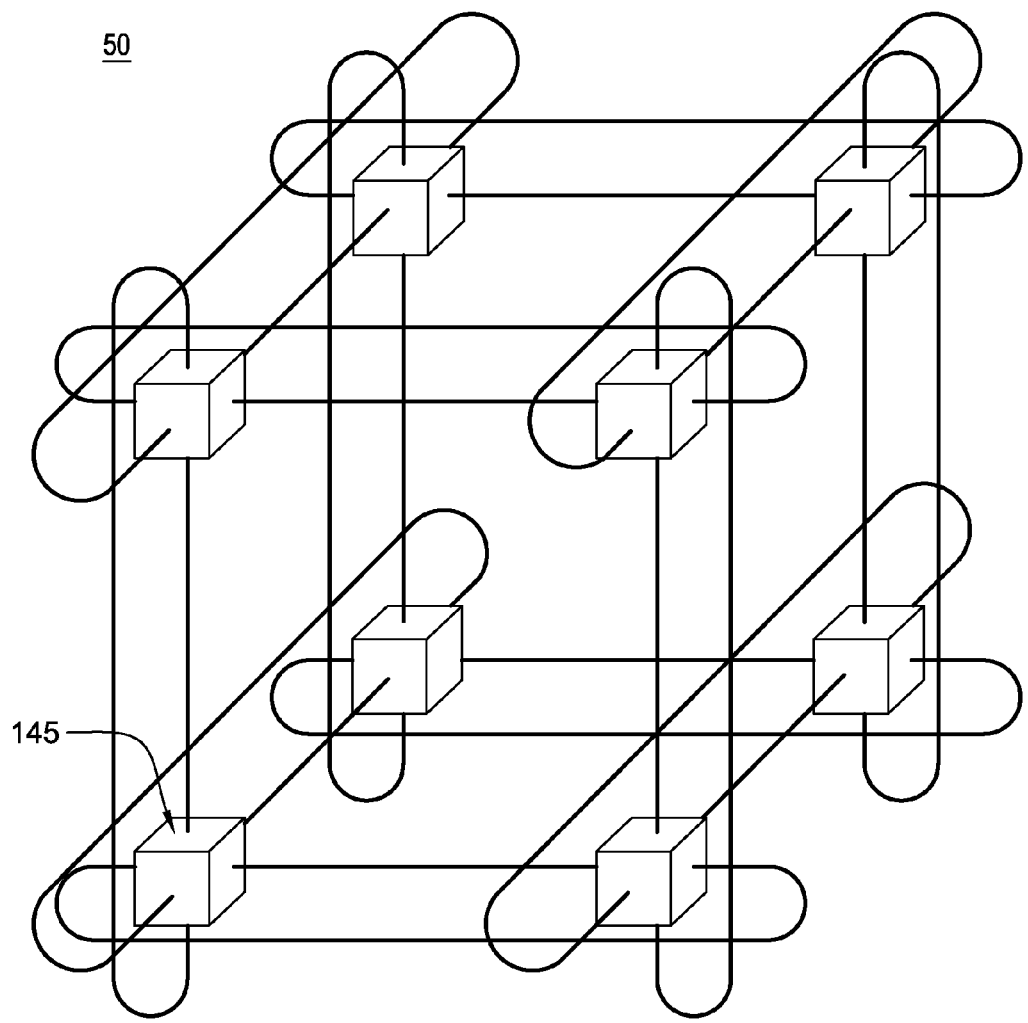

As described with respect to FIG. 9, the physical machine architecture is related to n-dimensional torus 50 which in the example embodiment, is a 3-dimensional nearest neighbor interconnect that is "wrapped" at the edges. All neighbor nodes 145 are equally distant, except for time-of-flight differences such as exist between different racks of ASICs. The nearest neighbors may be four times the processor speed (e.g., 3.4 Gb/s in each direction) in an example embodiment. Each node therefore supports 6 independent bi-directional nearest neighbor links with an aggregate bandwidth of 5.1 GB/s, for example. In one example embodiment, the system circuit cards are wired in sub-cubes while mid-planes, two per rack, are wired as sub-cubes.

The topology of network 50 of FIG. 9 is a three-dimensional torus constructed with bi-directional, point-to-point, serial links between routers embedded within the ASICs. Therefore, each compute node has six neighbor connections to the torus network, some of which may traverse relatively long cables. The torus network provides both adaptive and deterministic minimal-path routing, and is deadlock free. Throughput and latency are optimized through the use of virtual through (VCT) routing as described in the reference to P. Kermani and L. Kleinrock entitled "Virtual Cut-Through: A New Computer Communication Switching Technique," Computer Networks, Vol. 3, pp. 267-286, 1979 incorporated herein by reference. Messages may be composed of multiple packets, which are the atomic units of routing. Therefore, adaptively-routed packets from the same message may arrive out of order. Packets are variable in size, ranging from 32 bytes to 256 bytes with a granularity of 32 bytes (i.e., one to eight 32-byte chunks per packet).

As mentioned, Virtual channels (VCs) are used to provide deadlock-free adaptive routing and increase throughput and the torus network in the supercomputer and may have four or more VCs in a configuration whereby two VCs employ adaptive routing, and two employ deterministic routing. One of the deterministic VCs is used as an "escape channel" for the adaptive sub-network in order to guarantee deadlock freedom, and the other is reserved for high-priority packets. Because it is expected that most traffic will be adaptively routed, two adaptive VCs are provided in order to reduce head-of-line blocking and allow for the use of simple FIFO buffers within the routers.

Flow control between routers is provided through the use of tokens because the latency across a cable allows multiple packets to be in flight simultaneously. There is sufficient VCT buffer space to maintain full link bandwidth in the absence of contention.

In the implementation of the RTM seismic imaging governed according to equation (3), there is used four 3D data objects: the past, present and future waves and the velocity model. In one embodiment, to increase the locality of the model, a ping-pong buffer pair may be used, whereby the current wave (data) is held in one buffer and the future and past waves (data) held in the second buffer [http://www.pcmag.com/encyclopedia_term/0,2542,t=ping-pong+buffer&i=49297,00.asp. In one embodiment, however, a first buffer (Buffer A) may be used to compute the values of a second buffer (Buffer B) and then use Buffer B values to compute the values in Buffer A—and iterate—in order to save memory storage space. This buffering is possible because once the future wave point is calculated, the past wave point is no longer needed and can be overwritten with the future value. This buffering reduces RTM's cache size requirements by 25% and thereby allows for processing larger models more efficiently.

Figure 1:
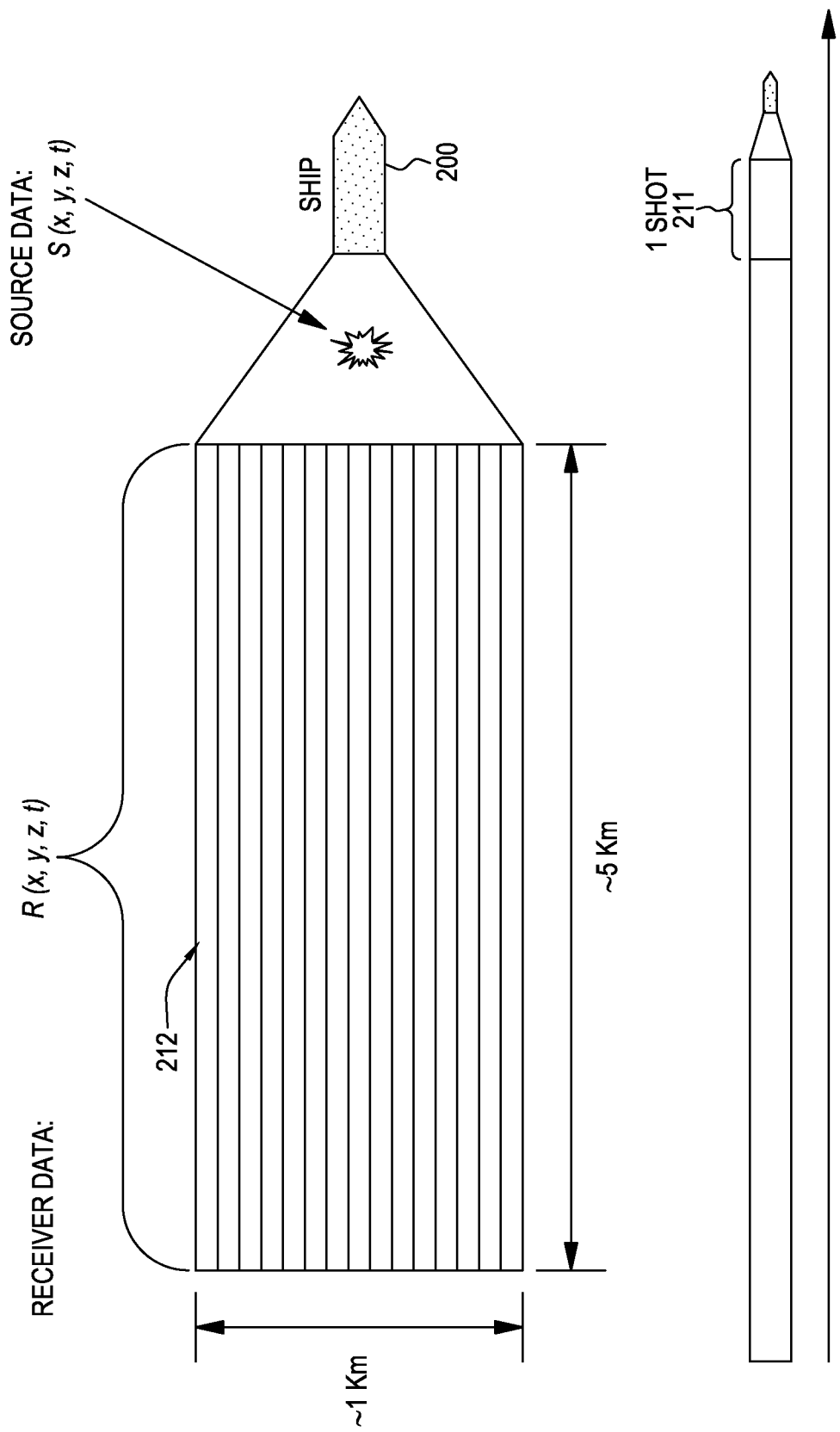
FIG. 1 depicts one RTM seismic data collection method implementing a towed hydrophone receiver arrays for ocean seismic data collection.
Figure 2:
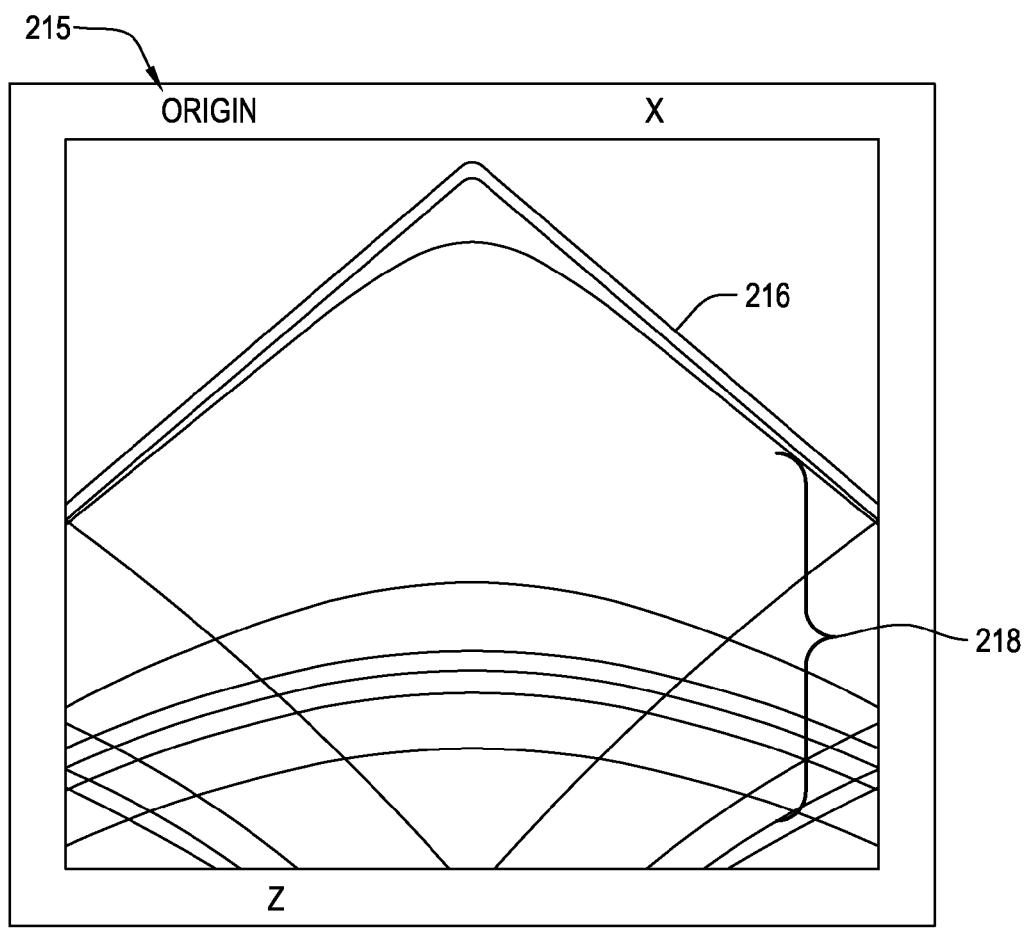
FIG. 2 depicts an example sample shot data for a 1D array of hydrophones showing time on the Y-axis and spatial offset on the X-axis.
Figure 3:
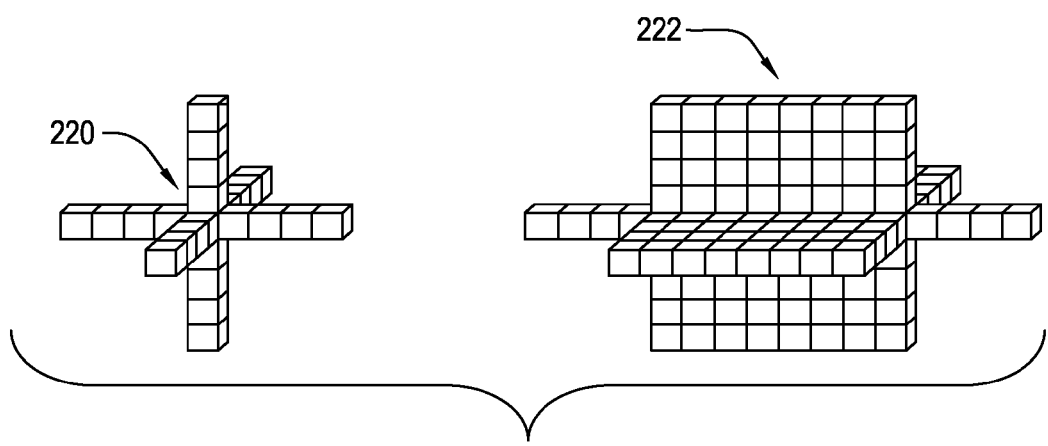
FIG. 3 depicts an 25-point spatial stencil with 8th order accuracy shown in isolation on the left and as it moves along the stride-1 dimension of the model.
Figure 4:
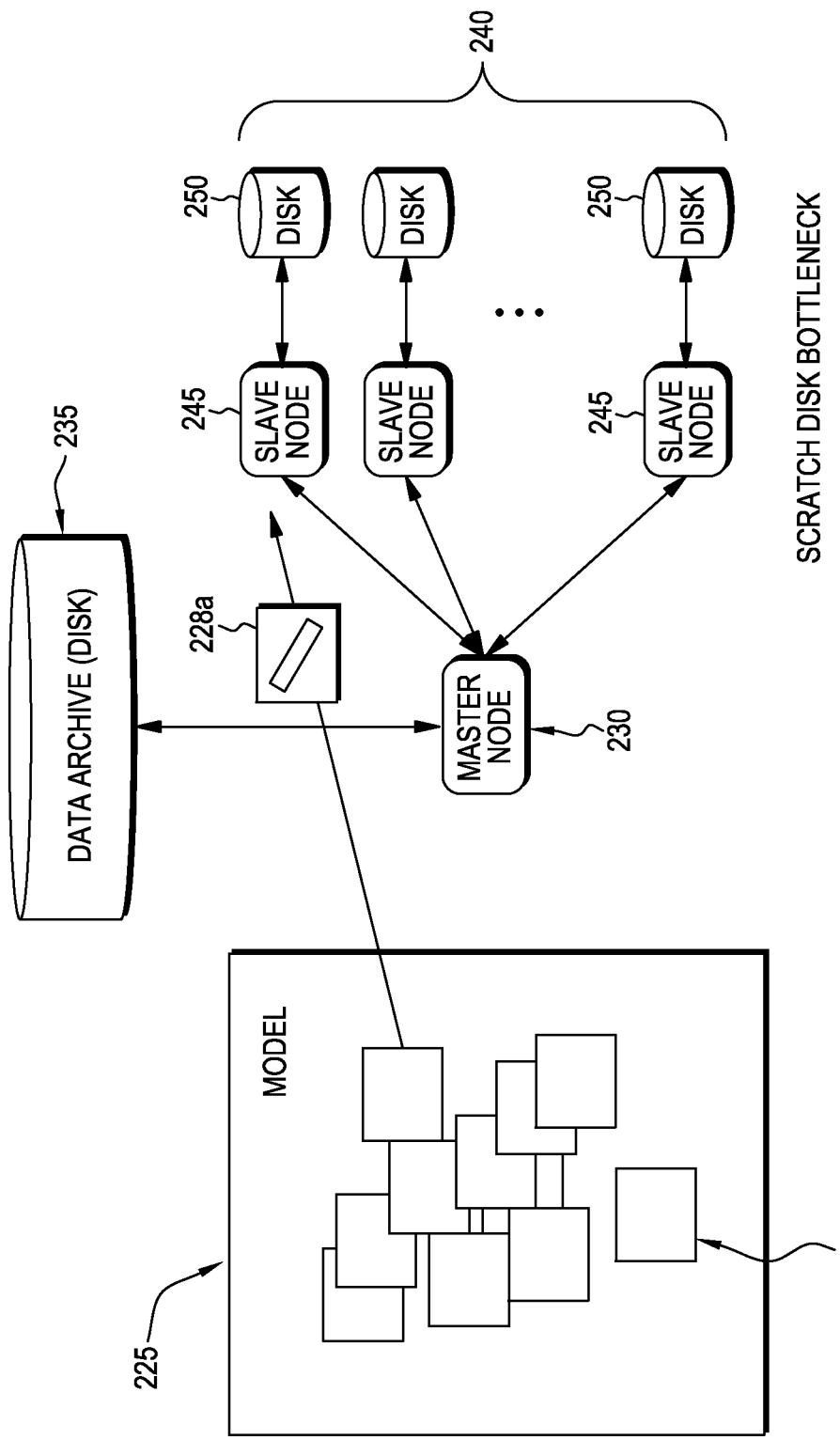
FIG. 4 shows parallel implementation of RTM that typically run individual shots on a node of a compute cluster and run many shots in parallel wherein the node implements scratch disk storage.

An analysis of the various trade-offs made in this implementation of RTM is helpful in guiding the choice of operational parameters. This analysis shows that various system constraints prevents running at the theoretically optimal operational parameters. Consider a cubic velocity model of size $N^3$ elements which is uniformly partitioned over $K^3$ nodes such that each node is responsible for processing a sub-volume of size $V=N^3/K^3$. For any sub-volume, the time required to compute the stencil (e.g., stencil 20 shown in FIG. 3) over all the elements of the corresponding sub-volume is estimated and the time required to communicate boundary data to and from its nearest neighbors is estimated. A balanced implementation utilizes equal time for these tasks so as to efficiently utilize all the machine's resources.

The $2^{nd}$ order in time and $8^{th}$ order in space finite difference method used in Equation (3) to approximate wave propagation gives rise to ~32 floating-point operations for each stencil calculation, if one pre-computes the spatial and temporal deltas into the stencil parameters. That is, the stencil/method instructions are coded into the assembly code at each processor; each processor having differences in what instructions are available and what assembly code sequences lead to the best performance. Depending on these details, the actual number of floating point operations will general vary. This pre-computation is possible here since the deltas are constant for RTM. Letting F be the peak number of FLOPS per node, then a total time to compute each sub-volume is bounded below by $TCompute=32(N/K)^3/F$.

A critical aspect of domain-partitioned RTM is that current wave data from neighboring sub-domain boundaries is required for stencil calculations at each time step. That is, as mentioned, the stencil in one partition may require data from a neighboring partition—which necessitates the transfer of boundary data between compute nodes for each time step of the algorithm. Since this boundary data transfer grows with the amount of partitioning and with the size of the stencil used, it can easily become a performance bottleneck. To avoid communication bottlenecks, the partitioned RTM on a Blue Gene/P supercomputer is designed specifically for extremely efficient inter-node communication attributable to both the Torus network and inter-node communications bandwidth.

Figure 6A:
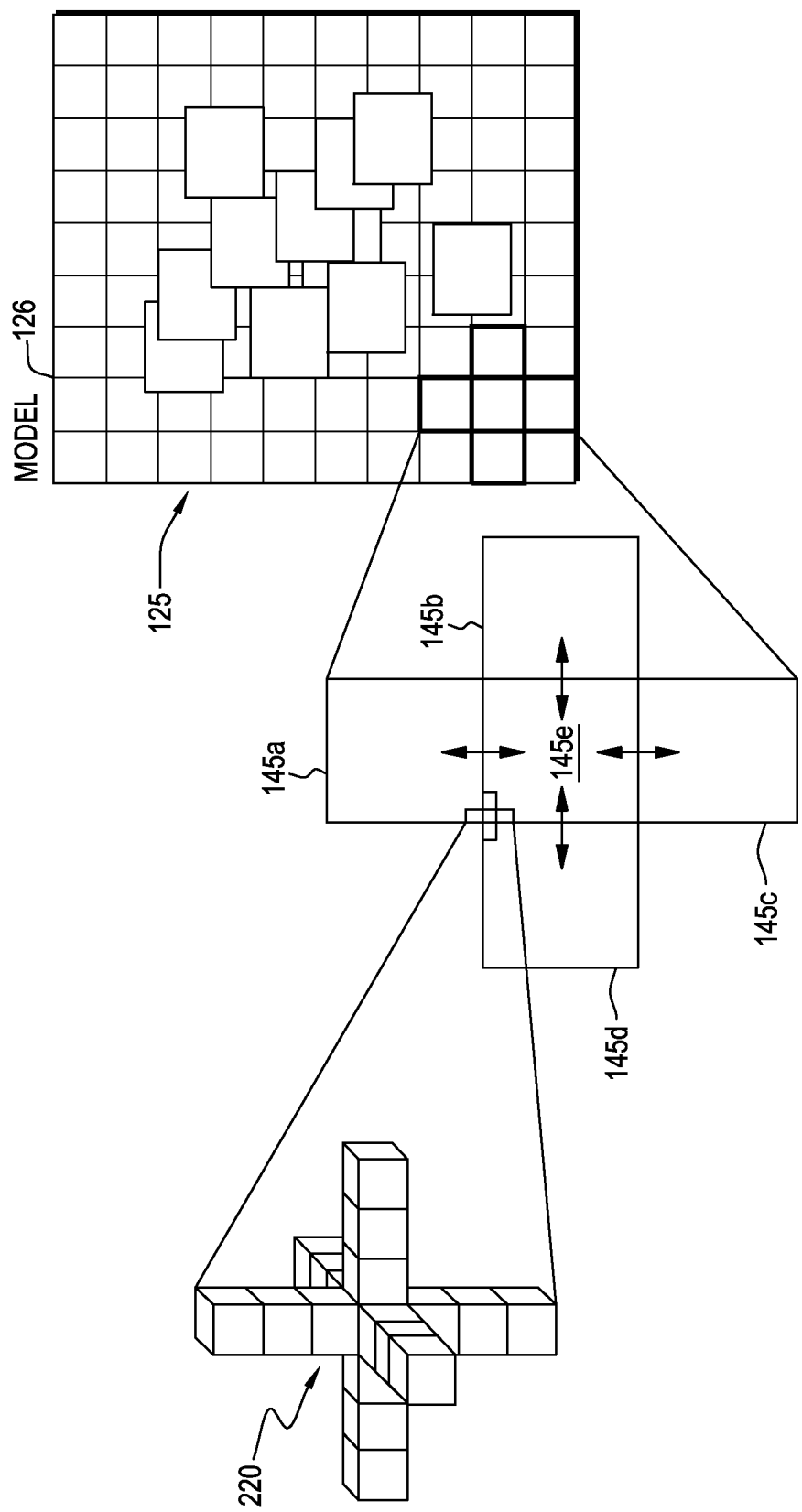
FIG. 6A depicts conceptually the stencil computations requiring neighboring node data communications in one embodiment.

That is, for each pass of the stencil over a wave sub-volume (volume partition), the boundary regions need to be communicated between nearest neighbor nodes as illustrated by bi-directional arrows shown in FIG. 6A that depicts the nearest neighbor communications for calculations performed for stencil 220 for a sub-volume velocity model partition at a node 145. FIG. 6A shows as a result of RTM domain partitioning in the model depicted in FIG. 6, efficient neighboring node communication as the wave equation stencil uses data from neighboring nodes 145a, 145b, 145c, 145d in its calculations at a node. In the processing, the equation stencil uses data from neighboring nodes, e.g., using MPI message communication between nodes.

Since the Blue Gene torus network allows nodes to send and receive data simultaneously, and since it has independent paths for each of the spatial (e.g., x- y- z-dimensions), it can be assumed that these nearest neighbor data transfers all happen at approximately the same time for each node. Further, since the algorithm sends the same amount of data between all nearest-neighbor nodes, the time of a single boundary transfer characterizes the communication behavior of the node. In one embodiment, the amount of data transferred for each finite difference time step is 4 bytes per element, 4 elements per stencil calculation per-dimension and one stencil calculation for each element on a face of the sub-volume.

Dividing this data by the peak torus send bandwidth, D, between each node gives a total time of $TData=16(N/K)^2/D$. This analysis shows that $TCompute/TData=2ND/KF$. For an ideal balanced system, this ratio is a value one (1), and N and K may be appropriately chosen.

Constraints exist that prevent choosing N and K arbitrarily. In particular, in one embodiment, there is stored all of the RTM models (e.g., velocity and two time steps of wave volume) in cache because complete cache locality gives a dramatic performance advantage. For an example RTM implementation, there is fixed 3 sub-volumes of size V in cache. Thus V<8/3 Mbytes for the example BGP implementation described herein. Since $V=N^3/K^3$, it is seen that N/K<89 which implies N/K<56 per core. For a rack, this means a velocity model of size $880^3$ fits in the cache implementation in BGP.

In a further embodiment, there may be considered several additional constraints on the block dimensions. The L1 cache line length imposes a preferred granularity in the stride-one (z) dimension of 8 floats (32B). The cache is used more effectively if the number of cache lines in the z dimension is not a factor or multiple of the number of sets in the set-associative cache (e.g., 16 for BGP), since otherwise memory accesses will be concentrated in some portions of the cache while other portions remain unused.

In a further embodiment, cache tiling is implemented to enable each dimension of the block be a multiple of the corresponding tile dimension. For example, improved performance may be achieved with a block size of 54×54×56 rather than $55^3$.

Choices of this nature trade kernel performance and MPI performance since asymmetry to favor stride-one dimension efficiency leads to higher communication requirements and help balance implementation. Additionally, the RTM imaging implementation saves snapshots data to main memory to avoid disk I/O bottlenecks. This choice imposes another constraint on the data: the model in cache is small enough to allow a sufficient number of snapshots to be saved.

Typically, production RTM runs can be on the order of five to ten thousand forward iterations, however due to disk storage and bandwidth constraints, practitioners typically sub-sample the data in time, saving only a fraction of the wave fields according to a pre-specified "snapshot" frequency.

Common snapshot frequencies range from 3-10 iterations per snapshot, depending on the RTM imaging requirements. For Blue Gene®, this implies up to about 1500 snapshots (=memory size/one-third the cache size), which imposes a snapshot frequency range of 3-7 iterations per snapshot. More snapshots can be saved (e.g., for higher image quality or more time iterations) however, by reducing the size of V and run on more nodes; or reduce the size and/or number of snapshots (e.g., by sub-sampling and/or compressing snapshots); or save some of the snapshots to disk. One example implementation includes all of these options.

Note that this analysis also shows that for practical values of N and K, TData is much larger that the MPI latency of both Blue Gene systems. So there is no MPI latency bound. Rather domain partitioning allows partitioning the domain over different numbers of computing nodes and thus takes advantage of the cache structure of the platform. When the partitioned subvolume can fit in processor cache, it allows processing to proceed at the speed of the cache memory bandwidth instead of main memory bandwidth.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, module or system. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A computer-implemented method for creating an image of sub-surface formations in a defined 2D or 3D volume of a geological structure comprising:
   partitioning a velocity model domain representing geophysical wavefield propagation characteristics of a sub-surface structure of the earth in said defined volume into a plurality of blocks, each block having an associated processing task for processing wave data;
   receiving, at an array of receiver devices at a surface of or within said defined volume, data representing measurements of each wave produced by a shot of a sequence of plural shots; and
   assigning each partitioned domain block to one or more processing nodes of a distributed processing parallel computer device having a plurality of processing nodes interconnected through one or more communication networks, the one or more communication networks including a nearest-neighbor 3D torus communications network in which each processing node is connected to six nearest neighbor processing nodes, each of the six nearest neighbor processing nodes being equally distant from the each processing node to which the six nearest neighbor processing nodes are connected;
   computing in parallel, using said associated processing tasks at each said processing node, data representing contributions of forward wave propagation data and reverse wave propagation at that node using said shot data;
   configuring each node for pipelined processing wherein said forward or reverse wave propagation data contributions are computed at the processing node and stored at said associated local memory storage device for current shot data while new data for a next shot is loaded into the local memory storage device at each node; and,
   combining, via the nearest-neighbor 3D torus communication network, said computed forward wave propagation data and reverse wave propagation data contributions stored at each node to form an imaging condition from which an image of sub-surface formations is created.

2. The computer-implemented method as claimed in claim 1, wherein said processing of a partitioned domain block at each node comprises:
   calculating current forward wave propagation data from a wavelet representing a model of a source at predetermined time steps; said calculating using said current forward wave data communicated from neighboring partitioned domain blocks stored in an associated local memory storage device of neighboring nodes;
   storing snapshots of calculated results of said current forward wave propagation data at one or more time instances in a local memory storage device associated with said node;

calculating said reverse wave propagation data representing reverse propagating waves in said volume using said receiver data; and, computing, using said stored forward wave propagation data and reverse wave propagation data, an image at each node; and, summing said computed images from each node to create a final image of reflecting boundaries, which represent said subsurface formations.

3. The computer-implemented method as claimed in claim 2, wherein said calculating reverse wave propagation data is performed in said reverse order time steps in lockstep with calculating said forward wave propagation data calculated in forward order.

4. The computer-implemented method as claimed in claim 2, wherein said calculating current forward wave propagation data from said shot data at predetermined time steps comprises: calculating the forward wave at each said time step in forward order, and calculating boundary data and storing said calculated boundary data to said local memory storage device at said node.

5. The computer-implemented method as claimed in claim 2, wherein said calculating said reverse wave propagation data in lock step with the second forward wave propagation data comprises, at each said time step, reading the prior stored current forward wave propagating data from local node memory storage device.

6. The computer-implemented method as claimed in claim 4, wherein one of said multiple independent networks interconnecting said nodes includes a multi-dimensional mesh network.

7. The computer-implemented method as claimed in claim 2, wherein said local memory storage device for the data used to calculated the waves at the next time step is a cache memory local to a processor at said compute node, a partitioned domain block fitting within said processor cache of a node to allow processing to proceed at an operating speed of a cache memory bandwidth.

8. The computer-implemented method as claimed in claim 1, wherein said velocity model domain partition is configurable according to a uniform or non-uniform spatial partitioning scheme.

9. The computer-implemented method as claimed in claim 2, optionally including at each calculation step: compressing the calculated current forward wave propagation data from said shot data prior to storing and, further decompressing said forward wave propagating data when reading the prior stored current forward wave propagating data.

10. The computer-implemented method as claimed in claim 2, wherein said forward current wave propagation data is calculated at predetermined time steps according to a pre-specified frequency, said method including repeating said partitioned domain block processing at each node for each of a plurality of shots generated.

11. A system for creating an image of sub-surface formations in a defined volume of a geological structure comprising:

an array of receiver devices at or within said defined volume for recording data representing measurements of each wave produced by a shot of a sequence of plural shots;

a distributed processing parallel computer device having a plurality of processing nodes interconnected through one or more networks, the one or more networks including a nearest-neighbor 3D torus communications network in which each processing node is connected to six nearest neighbor processing nodes, each of the six nearest neighbor processing nodes being equally distant from the each processing node to which the six nearest neighbor processing nodes are connected, each node having a respective processor device and a local memory storage device associated with the respective processor device, wherein one or more said processing nodes is assigned a processing block representing one partition of a partitioned velocity model domain representing geophysical wavefield propagation characteristics of a sub-surface structure of the earth in said defined volume, each processing block having an associated processing task for processing wave data associated with a shot;

wherein a processor device at each node is configured to perform, in parallel, a method comprising:

computing in parallel, using said associated processing tasks at each said processing node, data representing contributions of forward wave propagation data and reverse wave propagation at that node using said shot data;

configuring each node for pipelined processing wherein said forward or reverse wave propagation data contributions are computed at the processing node and stored at said associated local memory storage device for current shot data while new data for a next shot is loaded into the local memory storage device at each node; and, combining, via the nearest-neighbor 3D torus communication network, said computed forward wave propagation data and reverse wave propagation data contributions stored at each node to form an imaging condition from which an image of sub-surface formations is created.

12. The system as claimed in claim 11, wherein said processing device at each node is further configured to perform:

calculating current forward wave propagation data from a wavelet representing a model of a source wave at predetermined time steps; said calculating using said current forward wave data communicated from neighboring partitioned domain blocks stored in an associated local memory storage device of neighboring nodes;

storing snapshots of calculated results of said current forward wave propagation data at one or more time instances in a local memory storage device associated with said node;

calculating said reverse wave propagation data representing reverse propagating waves in said volume using said receiver data;

computing, using said stored forward wave propagation data and reverse wave propagation data, an image at each node; and, summing said computed images from each node to create a final image of reflecting boundaries which represent said subsurface formations.

13. The system as claimed in claim 12, wherein said calculating reverse wave propagation data is performed in said reverse order time steps in lockstep with calculating said forward wave propagation data calculated in forward order.

14. The system as claimed in claim 12, wherein said calculating current forward wave propagation data from said shot data at predetermined time steps comprises: calculating the forward wave at each said time step in forward order, and calculating boundary data and storing said calculated boundary data to said local memory storage device at said node.

15. The system as claimed in claim 12, wherein said calculating said reverse wave propagation data in lock step with the second forward wave propagation data comprises, at each said time step, reading the prior stored current forward wave propagating data from local node memory storage device.

16. The system as claimed in claim 14, wherein one of said multiple independent networks interconnecting said nodes includes a multi-dimensional mesh network.

17. The system as claimed in claim 12, wherein said local memory storage device for the data used to calculated the waves at the next time step is a cache memory local to a processor at said compute node, a partitioned domain block fitting within said processor cache of a node to allow processing to proceed at an operating speed of a cache memory bandwidth.

18. The system as claimed in claim 11, wherein said velocity model domain partitioning is configurable according to a uniform or non-uniform spatial partitioning scheme.

19. The system as claimed in claim 12, optionally including at each calculation step: compressing the calculated current forward wave propagation data from said shot data prior to storing and, further decompressing said forward wave propagating data when reading the prior stored current forward wave propagating data.

20. The system as claimed in claim 12, wherein said method further comprises:
    calculating said forward current wave propagation data at predetermined time steps according to a pre-specified frequency, said method including repeating said partitioned domain block processing at each node for each of a plurality of shots generated.

21. A computer program product for creating an image of sub-surface formations in a defined 2D or 3D volume of a geological structure, the computer program product comprising a storage medium readable by a processing circuit and storing instructions run by the processing circuit for performing a method, the method comprising:
    partitioning a velocity model domain representing geophysical wavefield propagation characteristics of a sub-surface structure of the earth in said defined volume into a plurality of blocks, each block having an associated processing task for processing wave data;
    receiving, at an array of receiver devices at a surface of or within said defined volume, data representing measurements of each wave produced by a shot of a sequence of plural shots; and
    assigning each partitioned domain block to one or more processing nodes of a distributed processing parallel computer device having a plurality of processing nodes interconnected through one or more communication networks, the one or more communication networks including a nearest-neighbor 3D torus communications network in which each processing node is connected to six nearest neighbor processing nodes, each of the six nearest neighbor processing nodes being equally distant from the each processing node to which the six nearest neighbor processing nodes are connected;
    computing in parallel, using said associated processing tasks at each said processing node, data representing contributions of forward wave propagation data and reverse wave propagation at that node using said shot data;
    configuring each node for pipelined processing wherein said forward or reverse wave propagation data contributions are computed at the processing node and stored at said associated local memory storage device for current shot data while new data for a next shot is loaded into the local memory storage device at each node; and,
    combining, via the nearest-neighbor 3D torus communication network, said computed forward wave propagation data and reverse wave propagation data contributions stored at each node to form an imaging condition from which an image of sub-surface formations is created.

22. The computer program product as claimed in claim 21, wherein said processing of a partitioned domain block at each node comprises:
    calculating current forward wave propagation data from a wavelet representing a model of a source at predetermined time steps; said calculating using said current forward wave data communicated from neighboring partitioned domain blocks stored in an associated local memory storage device of neighboring nodes;
    storing snapshots of calculated results of said current forward wave propagation data at one or more time instances in a local memory storage device associated with said node;
    calculating said reverse wave propagation data representing reverse propagating waves in said volume using said receiver data; and,
    computing, using said stored forward wave propagation data and reverse wave propagation data, an image at each node; and,
    summing said computed images from each node to create a final image of reflecting boundaries, which represent said subsurface formations.

23. The computer program product as claimed in claim 22, wherein said calculating reverse wave propagation data is performed in said reverse order time steps in lockstep with calculating said forward wave propagation data calculated in forward order.

24. The computer program product as claimed in claim 22, wherein said calculating current forward wave propagation data from said shot data at predetermined time steps comprises: calculating the forward wave at each said time step in forward order, and calculating boundary data and storing said calculated boundary data to said local memory storage device at said node.

25. The computer program product as claimed in claim 22, wherein said calculating said reverse wave propagation data in lock step with the second forward wave propagation data comprises, at each said time step, reading the prior stored current forward wave propagating data from local node memory storage device.

26. The computer program product as claimed in claim 22, wherein said local memory storage device for the data used to calculated the waves at the next time step is a cache memory local to a processor at said compute node, a partitioned domain block fitting within said processor cache of a node to allow processing to proceed at an operating speed of a cache memory bandwidth.

* * * * *